United States Patent
Tang

(10) Patent No.: US 6,311,513 B1
(45) Date of Patent: Nov. 6, 2001

(54) TRIPLE-EFFECT ABSORPTION REFRIGERATION SYSTEM WITH CONDENSATE-TO-SOLUTION SENSIBLE HEAT EXCHANGER

(75) Inventor: Jingsong Tang, Carmel, IN (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/473,051

(22) Filed: Dec. 28, 1999

(51) Int. Cl.$^7$ ...................................................... F25B 15/00
(52) U.S. Cl. .................................................. 62/476; 62/489
(58) Field of Search .............................. 62/476, 489, 483, 62/485, 141

(56) References Cited

U.S. PATENT DOCUMENTS

| | | | |
|---|---|---|---|
| Re. 36,045 | * | 1/1999 | Rockenfeller et al. ................. 62/476 |
| 5,205,136 | * | 4/1993 | DeVault et al. ........................ 62/476 |
| 5,727,397 | * | 3/1998 | He ......................................... 62/476 |
| 5,931,007 | * | 8/1999 | Sgamboti et al. ................. 62/476 X |
| 5,941,094 | * | 8/1999 | Tang et al. ........................ 62/489 X |
| 6,003,331 | * | 12/1999 | Kohler et al. ........................... 62/476 |

\* cited by examiner

Primary Examiner—Henry Bennett
Assistant Examiner—Chen-Wen Jiang

(57) ABSTRACT

Single loop, triple-effect absorption refrigeration systems are disclosed. These systems include an evaporator, absorber, and three generator and condenser pairs. Each generator is operatively connected to its paired condenser. Double-condenser coupling provides improved system thermal efficiency. Further improvements in thermal efficiency are achieved by incorporating a condensate-to-solution sensible heat exchanger.

8 Claims, 9 Drawing Sheets

TRIPLE-EFFECT ABSORPTION REFRIGERATION SYSTEM WITH CONDENSATE-TO-SOLUTION SENSIBLE HEAT EXCHANGER

BACKGROUND OF THE INVENTION

1. Field of the Invention

The present invention relates to a multiple-effect absorption refrigeration system. More particularly, the present invention relates to a single loop, triple-effect absorption refrigeration system.

2. Description of the Related Art

Absorption refrigeration systems are generally used to cool commercial buildings. For example, a single-effect absorption system typically comprises an evaporator, an absorber, and a generator and condenser pair. In this system, a refrigerant fluid in the evaporator absorbs heat from the air in the commercial building or enclosure being cooled, upon flashing to vapor. The refrigerant vapor flows to an absorber, where it mixes with a strong refrigerant-absorption solution (higher ratio of absorption fluid to refrigerant), forming a weak refrigerant-absorption solution (lower ratio of absorption fluid to refrigerant). The weak refrigerant-absorption solution is then pumped to a generator, where the solution is heated by an outside source referred to as primary heat. Typical sources of primary heat include a fuel burner, low-pressure steam, or hot water. This heating boils off some of the refrigerant, separating the solution into a refrigerant vapor and a strong refrigerant-absorption solution. The refrigerant vapor is then condensed to refrigerant fluid in the condenser and routed back to the evaporator. The strong refrigerant-absorption solution returns to the absorber. Single-effect absorption refrigeration systems such as that described above are extremely inefficient, having a thermal Coefficient of Performance (COP) of approximately 0.7.

A more modern approach uses a double-effect absorption refrigeration system. In this latter system, the single generator and condenser pair is replaced by two generator and condenser pairs (i.e., a high temperature generator and condenser pair, and a low temperature generator and condenser pair). A weak refrigerant-absorption solution is pumped to both generators. Primary heat is supplied to the high temperature generator to boil off some refrigerant vapor from its refrigerant-absorption solution. This refrigerant vapor is condensed in the high temperature condenser. The heat of condensation from the high temperature condenser is used to heat the refrigerant-absorption solution in the low temperature generator, in order to boil off some refrigerant vapor from its refrigerant-absorption solution. This refrigerant vapor is condensed in the low temperature condenser. In this manner, the primary heat input to the system is utilized twice to generate refrigerant vapor. As a result, the double-effect absorption refrigeration system is much more efficient than its single-effect counterpart, having a thermal COP of approximately 1.2.

In recent years, experiments have been conducted with triple-effect absorption refrigeration systems, utilizing three generator and condenser pairs (i.e., a high temperature generator and condenser pair, an intermediate temperature generator and condenser pair, and a low temperature generator and condenser pair). Various triple-effect absorption refrigeration systems will be described below.

In one such triple-effect absorption refrigeration system, a single absorber provides a weak refrigerant-absorption solution to three generators connected in series. The generators include high, intermediate, and low temperature generators. Because of their series connection, the refrigerant-absorption solution flowpath direction is from the absorber to the high temperature generator, then to the intermediate temperature generator, and then to the low temperature generator. In each generator, refrigerant vapor boils off to its paired condenser: high temperature condenser, intermediate temperature condenser, or low temperature condenser, respectively. In order to further improve thermal performance, the high temperature condenser is coupled with the intermediate temperature generator, and the intermediate temperature condenser is coupled with the low temperature generator. This coupling is known as double-condenser coupling (DCC). Hence, this system is referred to as a triple-effect absorption refrigeration system with DCC. Multiple heat exchangers transferring heat from the strong refrigerant-absorption solution returning to the absorber, to the weak refrigerant-absorption solution flowing to the generators, can also be provided in the series flowpath. The thermal COP for such a system is approximately 1.60 to 1.65.

In a similar triple-effect absorption refrigeration system with DCC, a single absorber provides a weak refrigerant-absorption solution to three generators connected in inverse series. Once again, the generators include high, intermediate, and low temperature generators. Because of their inverse series connection, the refrigerant-absorption solution flowpath direction is from the absorber to the low temperature generator, then to the intermediate temperature generator, and then to the high temperature generator. Multiple heat exchangers transferring heat from the strong refrigerant-absorption solution returning to the absorber, to the weak refrigerant-absorption solution flowing to the generators, can be provided in the inverse series flowpath. The thermal COP for such a system is approximately 1.68 to 1.72.

In another similar triple-effect absorption refrigeration system with DCC, a single absorber provides a weak refrigerant-absorption solution to three generators connected in parallel. Once again, the generators include high, intermediate, and low temperature generators. Because of their parallel connection, the refrigerant-absorption solution flowpath direction is from the absorber simultaneously to the high, intermediate, and low temperature generators. Multiple heat exchangers transferring heat from the strong refrigerant-absorption solution returning to the absorber, to the weak refrigerant-absorption solution flowing to the generators, can be provided in the parallel flowpath. The thermal COP for such a system is approximately 1.70 to 1.74.

In yet another similar triple-effect absorption refrigeration system with DCC, a single absorber provides a weak refrigerant-absorption solution to three generators connected in inverse parallel-series. Once again, the generators include high, intermediate, and low temperature generators. Because of their inverse parallel-series connection, the refrigerant-absorption solution flowpath direction is from the absorber simultaneously to the low and intermediate temperature generators, then from the intermediate temperature generator to the high temperature generator. Multiple heat exchangers transferring heat from the strong refrigerant-absorption solution returning to the absorber, to the weak refrigerant-absorption solution flowing to the generators, can be provided in the inverse parallel-series flowpath. The thermal COP for such a system is approximately 1.72 to 1.78.

Another related triple-effect absorption refrigeration system with DCC includes two evaporator and absorber pairs.

Mixed refrigerant-absorption solution is simultaneously pumped from the first absorber to the low temperature generator and from the second absorber to the intermediate and high temperature generators. Various other configurations have been proposed using multiple evaporator and/or absorber configurations.

In each of these triple-effect absorption refrigeration systems, the high temperature condenser yields a high temperature condensate stream that is much hotter than ambient temperature. This condensate has been typically cooled down and then throttled to evaporation temperature.

SUMMARY OF THE INVENTION

The present invention has been made in view of the above circumstances and is intended to provide single loop, triple-effect absorption refrigeration systems improved over the prior art.

Additional features and advantages of the invention will be set forth in part in the description which follows, and in part will be apparent from the description, or may be learned by practice of the invention. The objectives and other advantages of the invention may be realized and attained by the apparatus particularly pointed out in the written description and claims hereof as well as the appended drawings.

To achieve these and other advantages and in accordance with the purposes of the invention, as embodied and broadly described herein, a triple-effect absorption refrigeration system is provided. The system includes an evaporator. An absorber is operatively coupled to the evaporator. First, second, and third generators are provided, connected to receive a solution originating from the absorber and flowing to the first, second, and third generators. A heat source is provided for heating the solution in the third generator to a first temperature, thereby separating the solution in the third generator into a strong refrigerant-absorption solution and a refrigerant vapor. A flowpath is provided for returning the refrigerant-absorption solution from the third generator to the absorber. First, second, and third condensers are provided, operatively connected to receive and condense refrigerant vapor from the first, second, and third generators, respectively. The third condenser is operatively connected to exchange heat with the second generator, and the second condenser is operatively connected to exchange heat with the first generator. A heat exchanger is provided, operatively connected to exchange heat between the condensed refrigerant vapor from the third condenser and the solution flowing to the second or third generator.

Regarding the configuration of refrigerant-absorption solution flow to the first, second, and third generators, the three generators may be connected in series, inverse series, parallel, series-parallel, parallel-series, inverse series-parallel, inverse parallel-series, or similar arrangements. A weak refrigerant-absorption solution is fed from the absorber to the generators according to the flow configuration. In each generator, some refrigerant vapor is boiled off, separating the solution into a refrigerant vapor and a strong refrigerant-absorption solution. Vaporized refrigerant from the generators is condensed as discussed above and returned to the evaporator as refrigerant fluid. This refrigerant fluid absorbs heat to obtain the desired refrigeration effect, flashing to refrigerant vapor and flowing to the absorber. Strong refrigerant-absorption solutions from the generators also return to the absorber, mixing there with the refrigerant vapor flowing from the evaporator to form the weak refrigerant-absorption solution, and completing the flow cycle.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification. These drawings illustrate several embodiments of the invention and, together with the description, serve to explain the principles of the invention.

BRIEF DESCRIPTION OF THE DRAWINGS

The accompanying drawings, which are incorporated in and constitute a part of the specification, illustrate preferred embodiments of the invention. Together with the description, the drawings help to explain the objectives, advantages, and principles of the invention. In the drawings.

DETAILED DESCRIPTION OF THE PREFERRED EMBODIMENT

Reference will now be made in detail to the present preferred embodiments of the invention as broadly illustrated in the accompanying drawings.

Figure 1:
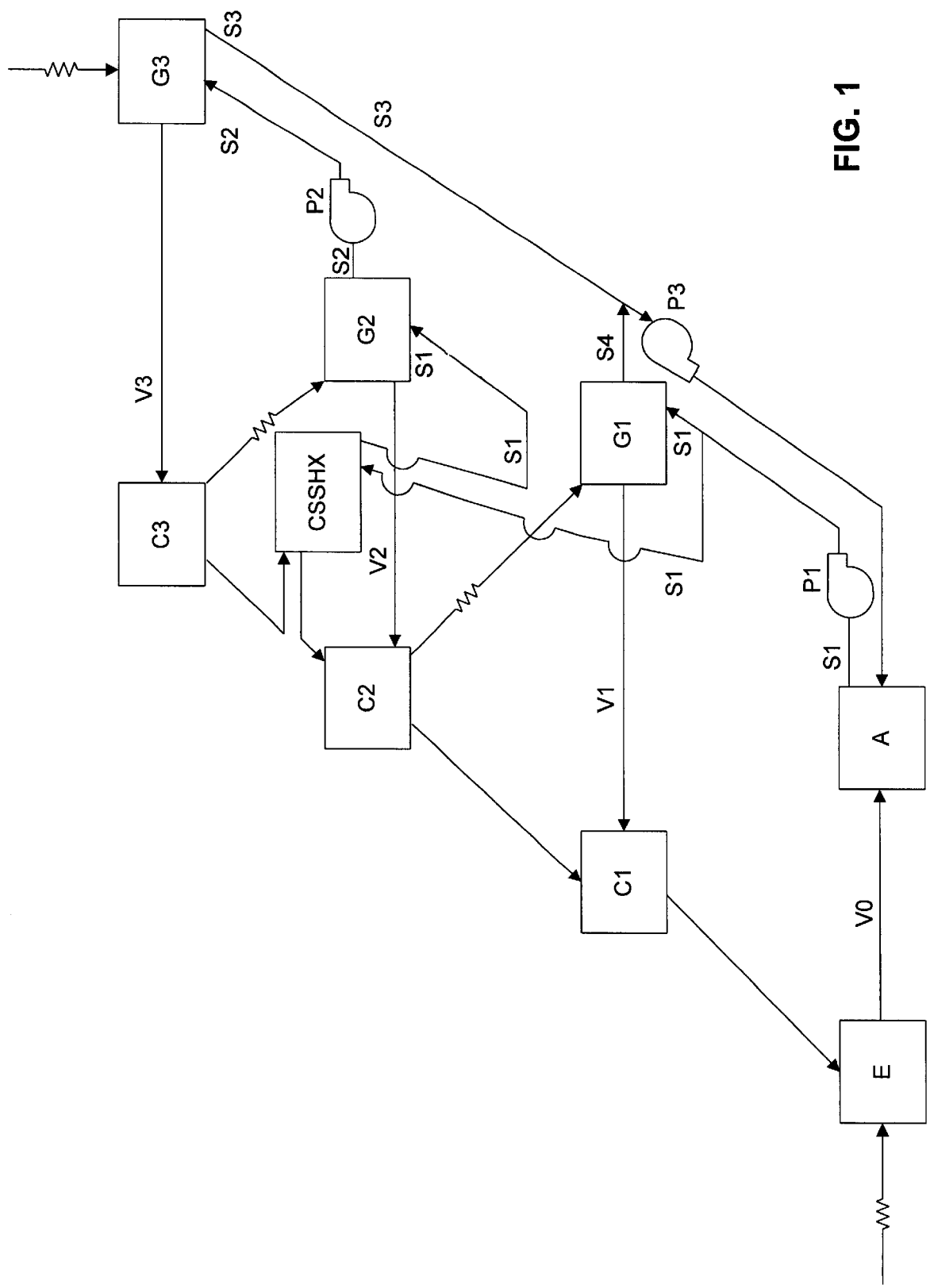
FIG. 1 is a schematic illustrating one embodiment of a triple-effect absorption refrigeration system of the present invention.

An exemplary embodiment of the present invention is a triple-effect absorption refrigeration system, as generally illustrated in FIG. 1.

As embodied herein and referring to FIG. 1, the triple-effect absorption refrigeration system includes an evaporator E. Evaporator E is the component which receives the refrigeration load, and thereby cools the building or enclosure being refrigerated. Evaporator E may be any of the evaporators that are well known in the art.

In accordance with the invention, an absorber is operatively coupled to the evaporator. As generally embodied in FIG. 1, absorber A is connected to evaporator E via a conduit to receive refrigerant vapor V0 from evaporator E. Absorber A is a single absorber. Absorber A may be any of the absorbers that are well known in the art.

In accordance with the invention, first, second, and third generators are provided. The first and second generators are connected in parallel with the absorber to receive a refrigerant-absorption solution from the absorber, and the third generator is connected in series with the second generator to receive a refrigerant-absorption solution from the second generator. As generally embodied in FIG. 1, a first low temperature generator G1, a second intermediate temperature generator G2, and a third high temperature generator G3 are provided. Generators G1 and G2 are connected in parallel with absorber A. Generator G3 is connected in series with generator G2.

As shown in FIG. 1, a first weak refrigerant-absorption solution S1 containing both refrigerant and an absorption fluid, preferably a weak LiBr solution, is transferred from absorber A to generators G1 and G2. Preferably, a first solution pump P1 is provided to pump solution S1 to generators G1 and G2. Because generators G1 and G2 are connected in parallel, the percentage of first solution S1 pumped to either generator G1 or G2 can be controlled and varied by methods well known in the art. Typically, approximately 50% of first solution S1 is pumped to generator G1 and approximately 50% is pumped to generator G2.

As further shown in FIG. 1, the portion of solution S1 flowing to generator G2 first travels to a condensate-to-solution sensible heat exchanger CSSHX. In condensate-to-solution sensible heat exchanger CSSHX, this portion of solution S1 is preheated by condensed refrigerant fluid from condenser C3. This preheated portion of solution S1 then flows to generator G2.

Selection of condensate-to-solution sensible heat exchanger CSSHX design is influenced by a number of factors including, but not limited to, capacity, cost, efficiency at full and partial load conditions, flow distribution, flow rates, and reliability. As generally embodied in FIG. 1, the flow rate of solution S1 through condensate-to-solution sensible heat exchanger CSSHX is significantly greater than the flow rate of the condensed refrigerant fluid. Presently, the inventor believes that a plate heat exchanger is the preferred condensate-to-solution sensible heat exchanger CSSHX design.

As further shown in FIG. 1, a second weak solution S2 is transferred from generator G2 to generator G3. Preferably, a second solution pump P2 is provided to pump solution S2 from generator G2 to generator G3. Solution S2 is the same weak refrigerant-absorption solution that entered generator G2, but is now somewhat stronger than when it entered G2 as solution S1 for reasons to be described below. Because generators G2 and G3 are connected in series, substantially all of the volume of second solution S2 is transferred from G2 to G3.

In accordance with the present invention, strong refrigerant-absorption solution from the first generator is returned to the absorber. As depicted in FIG. 1, solution S4 returns from generator G1 to absorber A. As embodied in FIG. 1, a third solution pump P3 is provided to assist in returning solution S4 to the absorber.

In accordance with the invention, a heat source is provided for heating the solution in the third generator to a first temperature, thereby separating the solution in the third generator into a refrigerant vapor and a strong refrigerant-absorption solution. As embodied in FIG. 1, a heat input is provided to high temperature generator G3.

In the present invention, the heat source may be one of two types. The system may be an "indirect-fired" system, which means that a thermal fluid, i.e., a heat transfer fluid, hot water, or steam, may serve as the heat source applied to high temperature generator G3. Alternatively, the system may be a "direct-fired" system, using a gas burner, some other type of furnace, or a heating element or system as the heat source.

Application of the heat input to solution S2 in generator G3 raises the solution to a temperature, which preferably is approximately 431° F. At this temperature, some refrigerant in solution S2 is boiled off in the form of refrigerant vapor. This step leaves behind a third solution S3, which is a strong refrigerant-absorption solution.

In accordance with the present invention, strong refrigerant-absorption solution S3 from the third generator is returned to the absorber. As depicted in FIG. 1, solution S3 returns to absorber A. As embodied in FIG. 1, a third solution pump P3 is provided to assist in returning solution S3 to the absorber.

A heat mass transfer additive may be added to refrigerant-absorption solutions S1, S2, S3, or S4.

In accordance with the invention, first condenser C1, second condenser C2, and third condenser C3 are operatively connected to receive and condense refrigerant vapor from the first generator G1, second generator G2, and third generator G3, respectively. Also, third condenser C3 is operatively connected to exchange heat with second generator G2, and second condenser C2 is operatively connected to exchange heat with the first generator G1.

As depicted in FIG. 1, refrigerant vapor V3, having been boiled off in third generator G3, flows into third condenser C3. Although shown schematically as a separate component in FIG. 1, third condenser C3 is physically located so that hot vapor V3 transfers heat to solution S1 in second generator G2. This heat transfer between third condenser C3 and second generator G2 condenses vapor V3 in condenser C3, while at the same time raising the solution S1 in second generator G2 to a second temperature, which is lower than the first temperature in third generator G3, but still causing some of the refrigerant in solution S1 in second generator G2 to flash to refrigerant vapor V2.

As shown in FIG. 1, high temperature condensate from third condenser C3 flows through condensate-to-solution sensible heat exchanger CSSHX to second condenser C2. Refrigerant vapor V2 from second generator G2 also flows to second condenser C2. Although shown schematically as a separate component in FIG. 1, second condenser C2 is physically located so that hot vapor V2 and high temperature condensate from third condenser C3 transfer heat to solution S1 in first generator G1. This heat transfer between second condenser C2 and first generator G1 condenses vapor V2 in second condenser C2, while at the same time raising the solution S1 in first generator G1 to a third temperature, which is lower than the first and second temperatures, but still causing some of the refrigerant in solution S1 in first generator G1 to flash to refrigerant vapor V1.

As shown in FIG. 1, the refrigerant condensate from second condenser C2, and the refrigerant vapor V1 from first generator G1 flow to first condenser C1. Heat is rejected (i.e., to ambient) at first condenser C1, thereby condensing substantially all of the refrigerant. The cool fluid refrigerant flows back to evaporator E in order to exchange heat with the refrigeration load, beginning the cycle over again.

The above-described triple-effect absorption system feeds solution from a single absorber to first and second generators in parallel, and solution from the second generator is then fed in series to a third generator. This inverse parallel-series solution feeding arrangement provides the following advantages over previous triple-effect absorption system arrangements.

The inverse parallel-series system has a higher thermal COP and a lower G3 temperature than previous systems. The thermal COP for the invention is approximately 1.736, and G3 temperature is approximately 431° F. These values compare favorably to a parallel system thermal COP of approximately 1.730 and G3 temperature of approximately 439° F., and a series system thermal COP of approximately 1.608 and G3 temperature of approximately 433° F. Lower G3 temperature equates to a longer system life and safer operation.

Corrosion of system materials and decomposition of heat mass transfer additives under high generator G3 temperatures have served as major barriers to the success of previous triple-effect absorption systems. The lower generator G3 temperature achievable by the inverse parallel-series solution flow helps to correct both problems.

Having only generators G1 and G2 connected in parallel, rather than all three generators G1, G2, and G3 in parallel as in the parallel system, greatly improves flow control.

Because the preheated solution S2 exiting G2 flows directly to G3, with no other solution added in, no temperature loss occurs due to mixing two solutions at different temperatures. This elimination of mixing losses improves thermal efficiency.

In a preferred embodiment of the present invention, one or more heat exchangers are provided in the solution flowpaths in order to preheat the solution prior to entering the respective generators. This preheating increases the system thermal COP.

Figure 2:
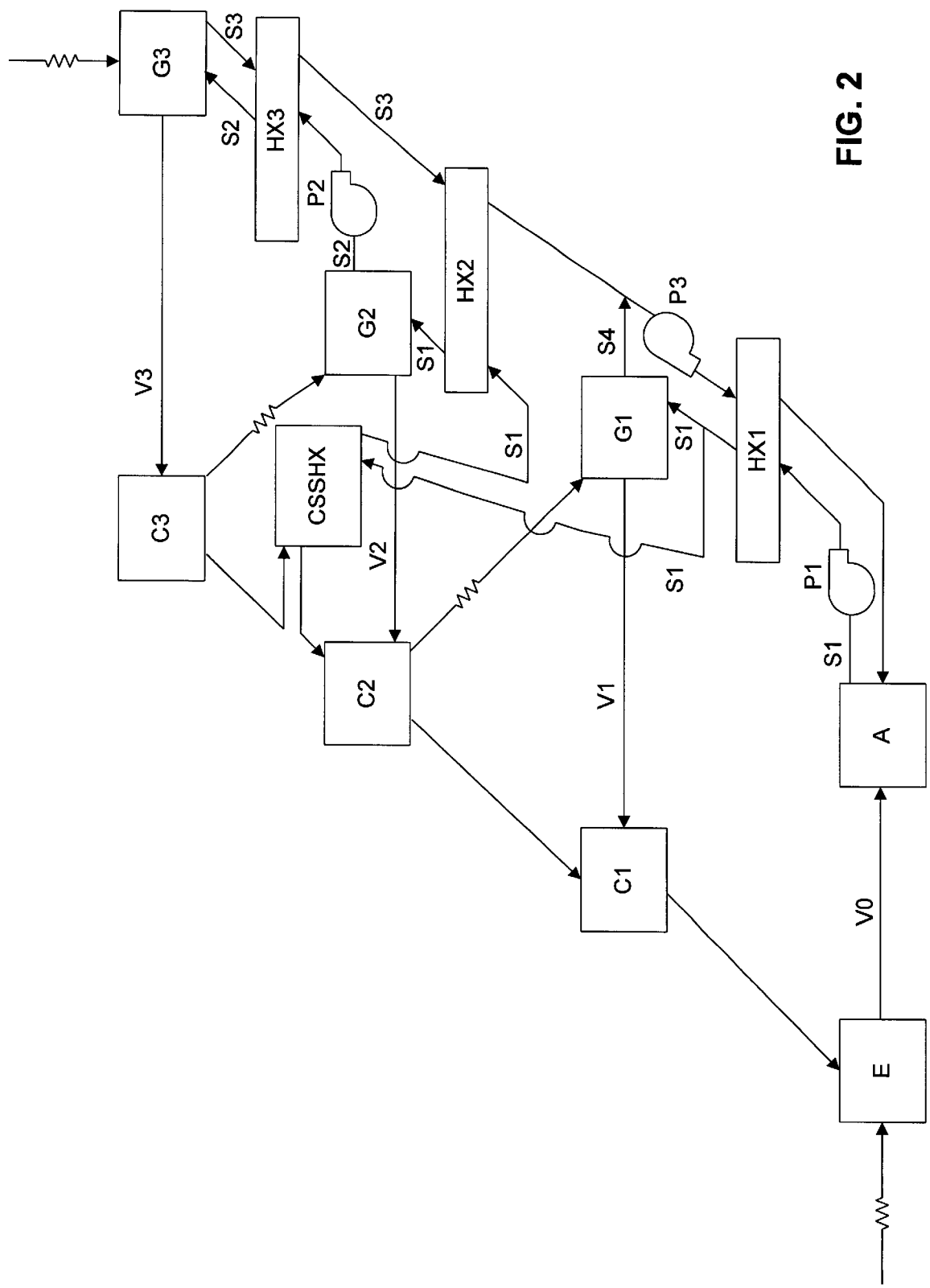
FIG. 2 is a schematic illustrating another embodiment of the triple-effect absorption refrigeration system of the present invention.

As shown in FIG. 2, a first heat exchanger HX1 is operatively connected to preheat the solution from the absorber to the first and second generators. First heat exchanger HX1 receives weak solution S1 from absorber A and preheats solution S1 with a combination of hot, strong refrigerant-absorption solution S3 from third generator G3 and another strong refrigerant-absorption solution S4 returning from generator G1. A portion of the preheated solution S1 then enters first generator G1.

Control of the mixing ratio between solutions S3 and S4 is generally achieved by controlling their respective flow rates. Control of the flow rates of solutions S3 and S4 is generally achieved by controlling and varying the percentage of first solution S1 pumped to either generator G1 or G2 as described above.

As further shown in FIG. 2, another portion of preheated solution S1 continues to a condensate-to-solution sensible heat exchanger CSSHX. In condensate-to-solution sensible heat exchanger CSSHX, the second portion of preheated solution S1 is further preheated by condensed refrigerant fluid from condenser C3. This further preheated solution S1 then enters second heat exchanger HX2.

As also shown in FIG. 2, this further preheated solution S1 is additionally preheated in second heat exchanger HX2 by hot, strong refrigerant-absorption solution S3 from third generator G3. This additionally preheated portion of solution S1 now enters second generator G2.

Second solution S2 leaving second generator G2 passes through a third heat exchanger HX3, where it is preheated by hot, strong refrigerant-absorption solution S3 from third generator G3. The preheated solution S2 then enters generator G3.

The strong refrigerant-absorption solution from the third generator is returned to the absorber. As depicted in FIG. 2, solution S3 returns to absorber A via heat exchangers HX3, HX2, and HX1. As embodied in FIG. 2, a third solution pump P3 is provided to assist in returning solution S3 to the absorber. Pump P3 preferably is provided between the point at which solution S3 and solution S4 combine and heat exchanger HX1.

Typically, approximately 50% of preheated solution S1 flows from absorber A to generator G1. This means that typically, approximately 50% of preheated solution S1 also flows to generator G2, and subsequently to generator G3. Thus, the load on heat exchangers HX2 and HX3 is smaller than in a series system, in which all of the solution is passed through heat exchangers HX1, HX2, and HX3. The load on heat exchanger HX2 in the present system also is smaller than in a comparable parallel system (typically, approximately 50% in the present system compared to approximately 60–70% in the parallel system). The load on heat exchanger HX3 in the present system is similar to the heat exchanger HX3 load in a comparable parallel system.

Figure 3:
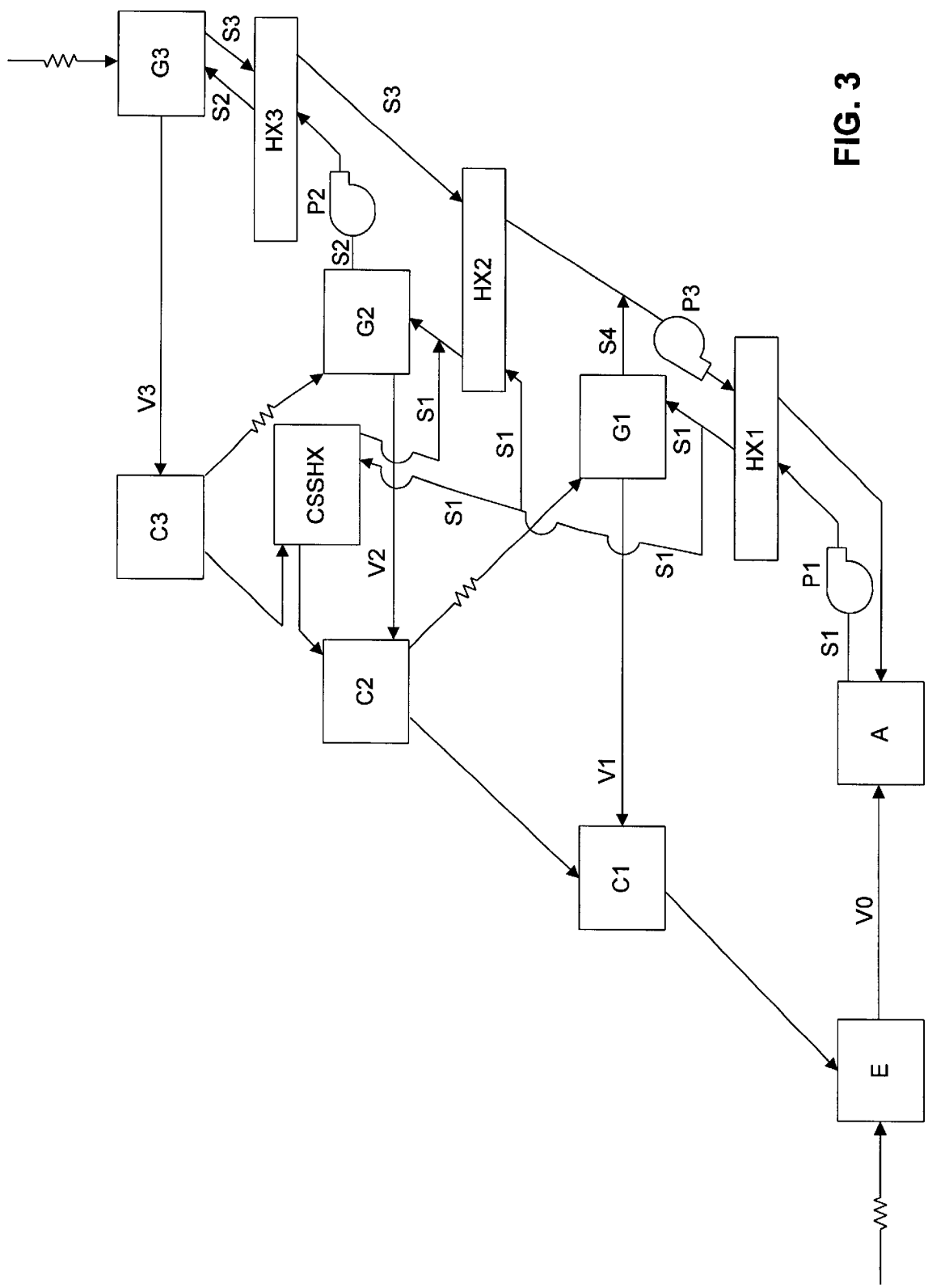
FIG. 3 is a schematic illustrating yet another embodiment of the triple-effect absorption refrigeration system of the present invention.
Figure 4:
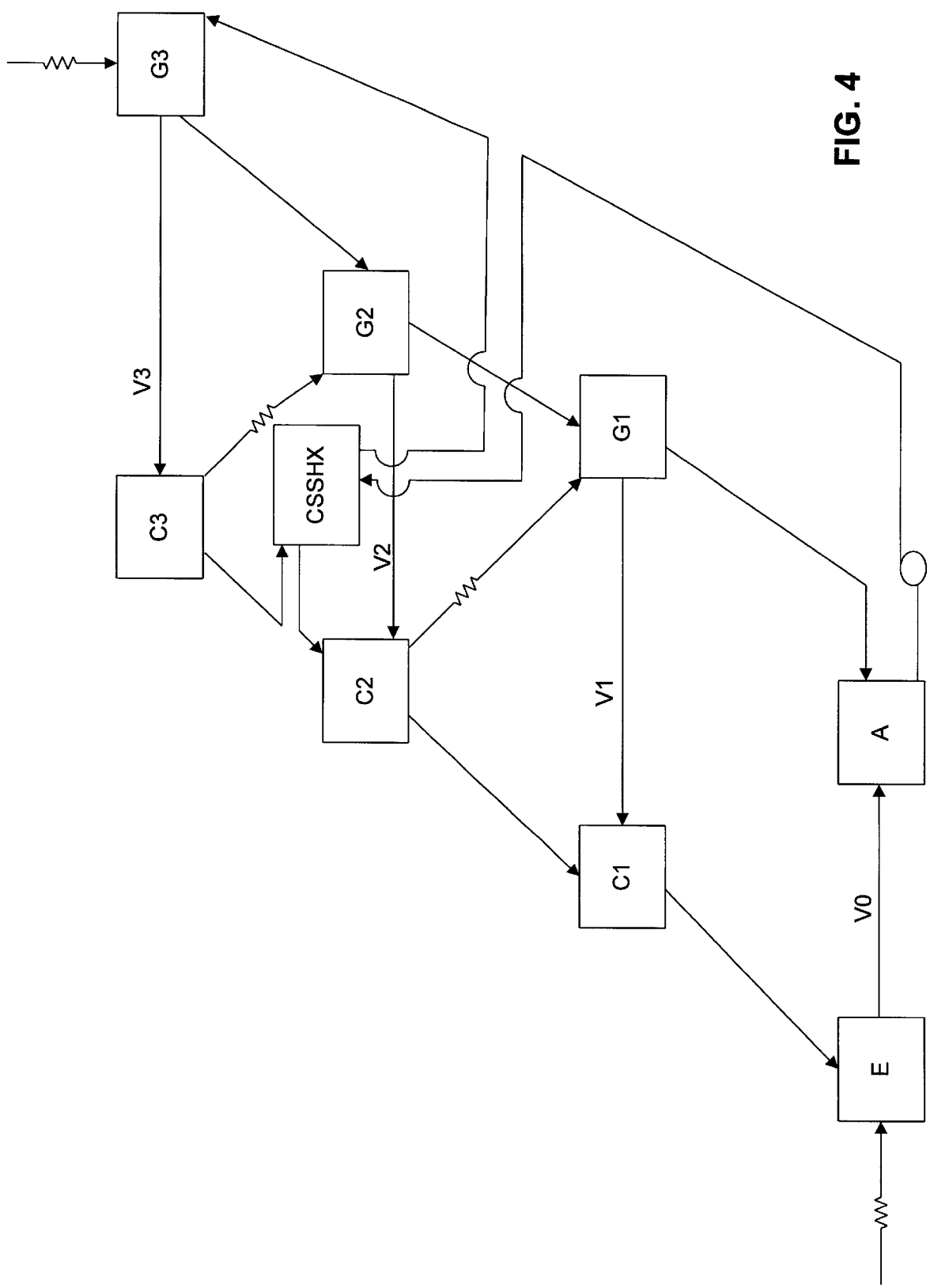
FIG. 4 is a schematic illustrating yet another embodiment of the triple-effect absorption refrigeration system of the present invention.
Figure 5:
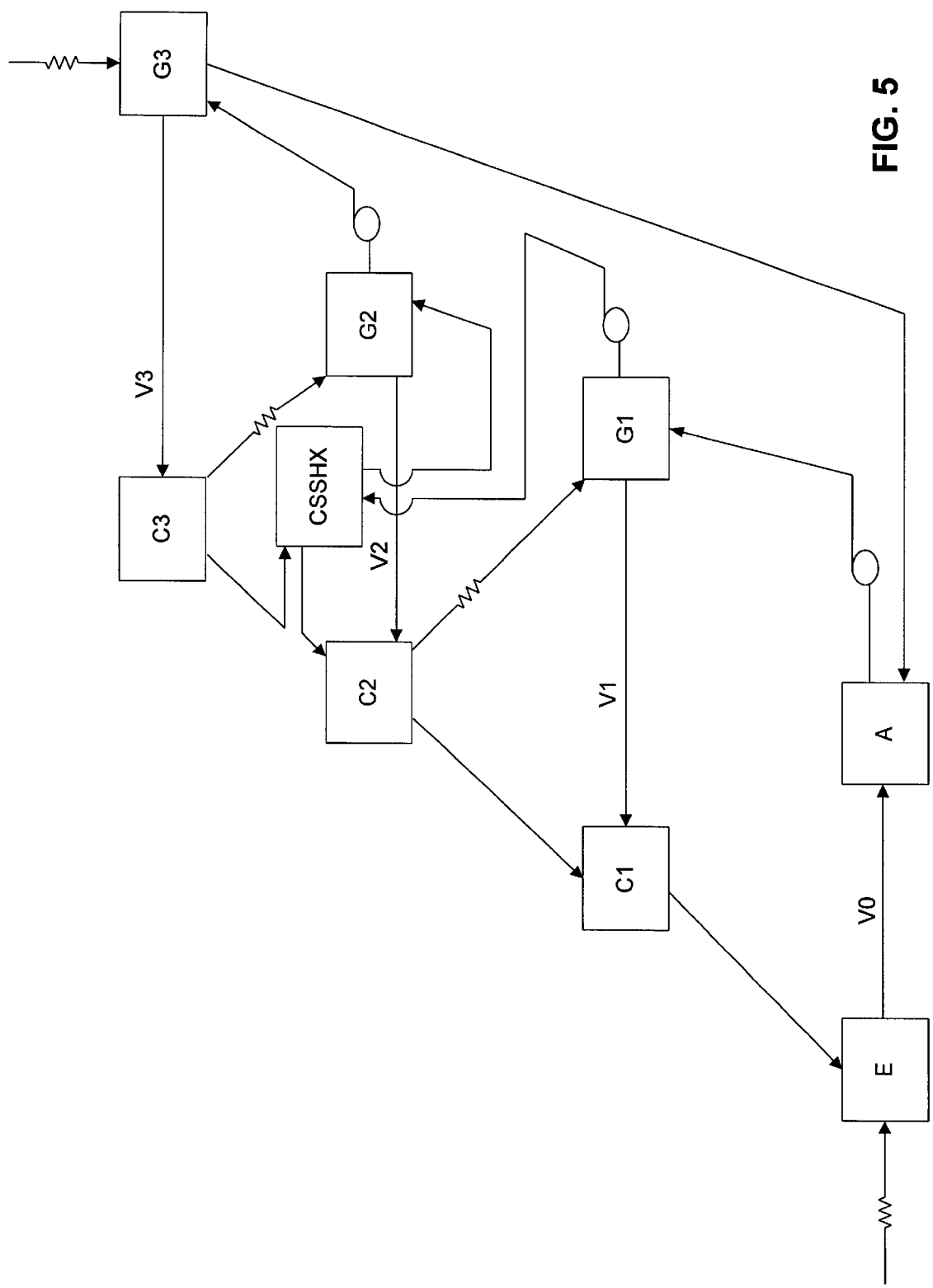
FIG. 5 is a schematic illustrating yet another further embodiment of the triple-effect absorption refrigeration system of the present invention.
Figure 6:
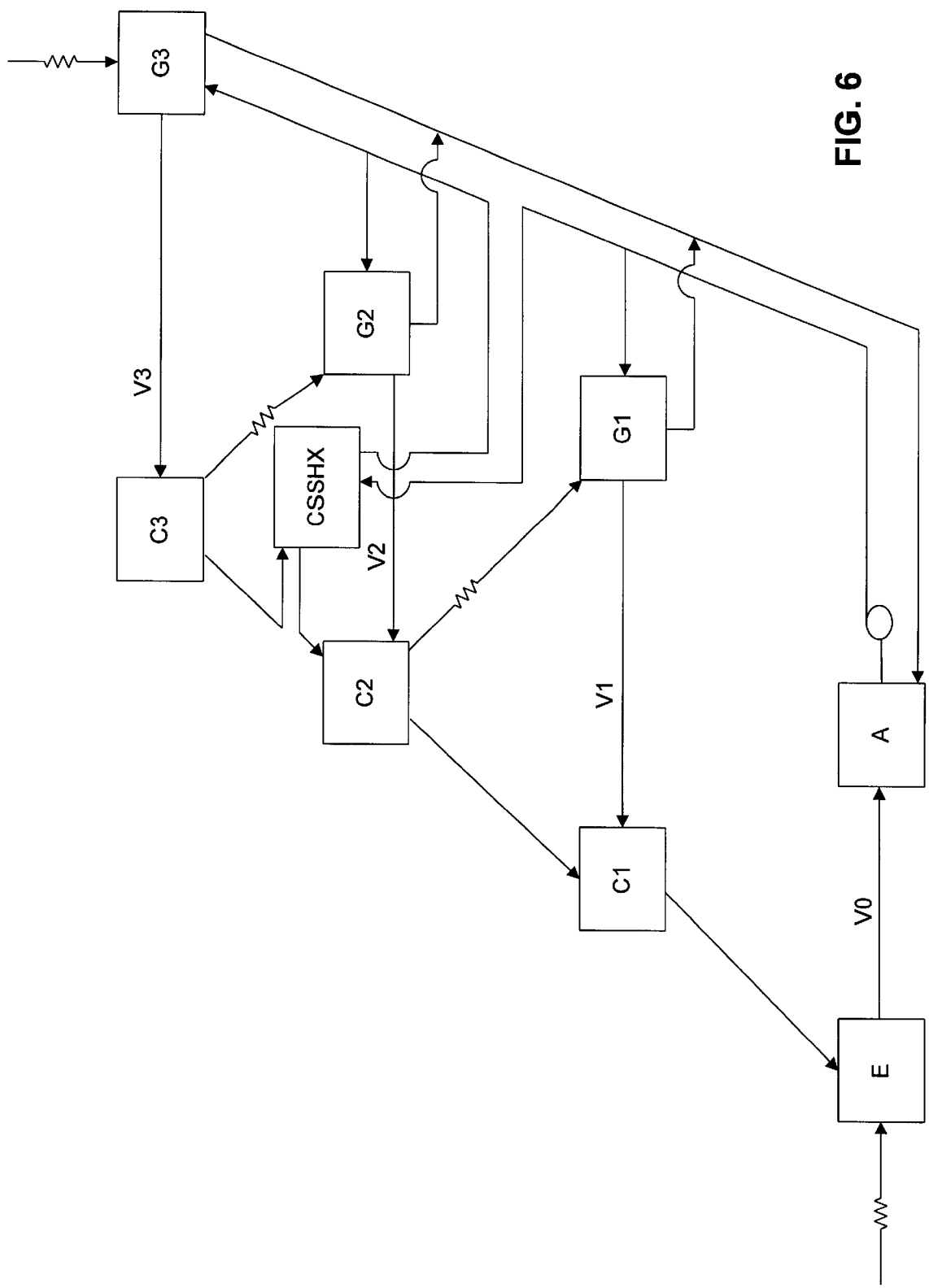
FIG. 6 is a schematic illustrating yet another further embodiment of the triple-effect absorption refrigeration system of the present invention.
Figure 7:
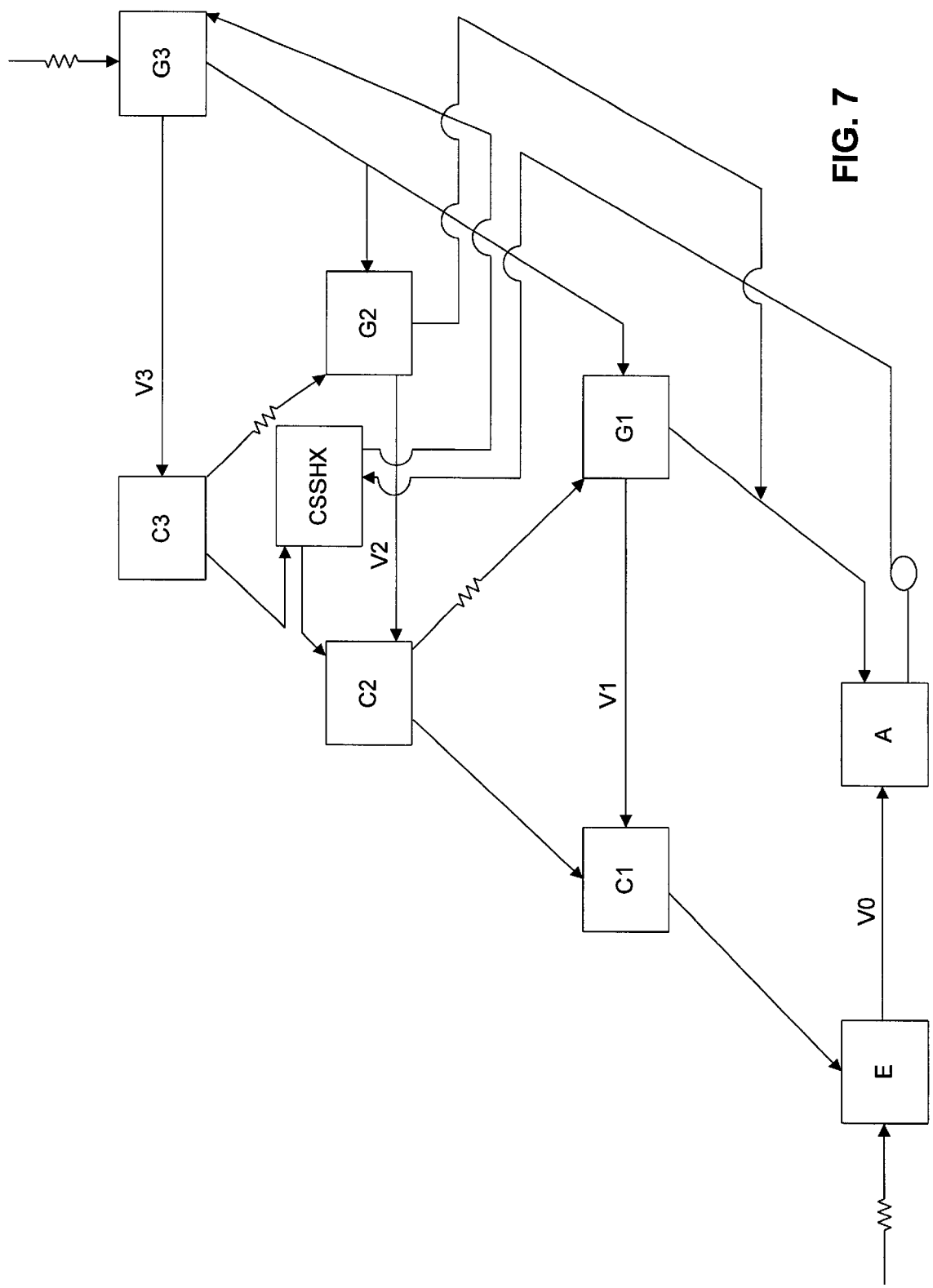
FIG. 7 is a schematic illustrating a further embodiment of the triple-effect absorption refrigeration system of the present invention.
Figure 8:
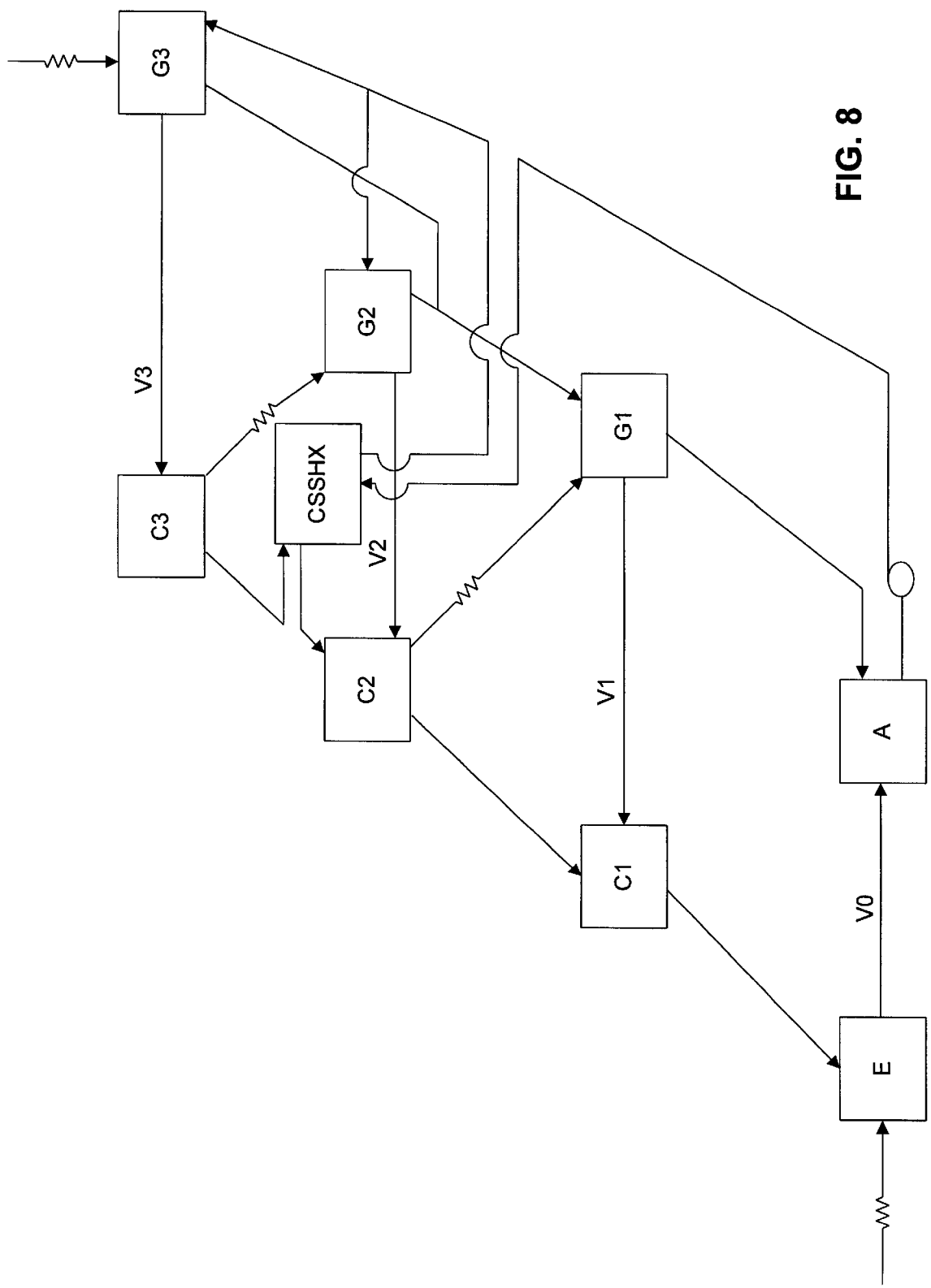
FIG. 8 is a schematic illustrating another further embodiment of the triple-effect absorption refrigeration system of the present invention.
Figure 9:
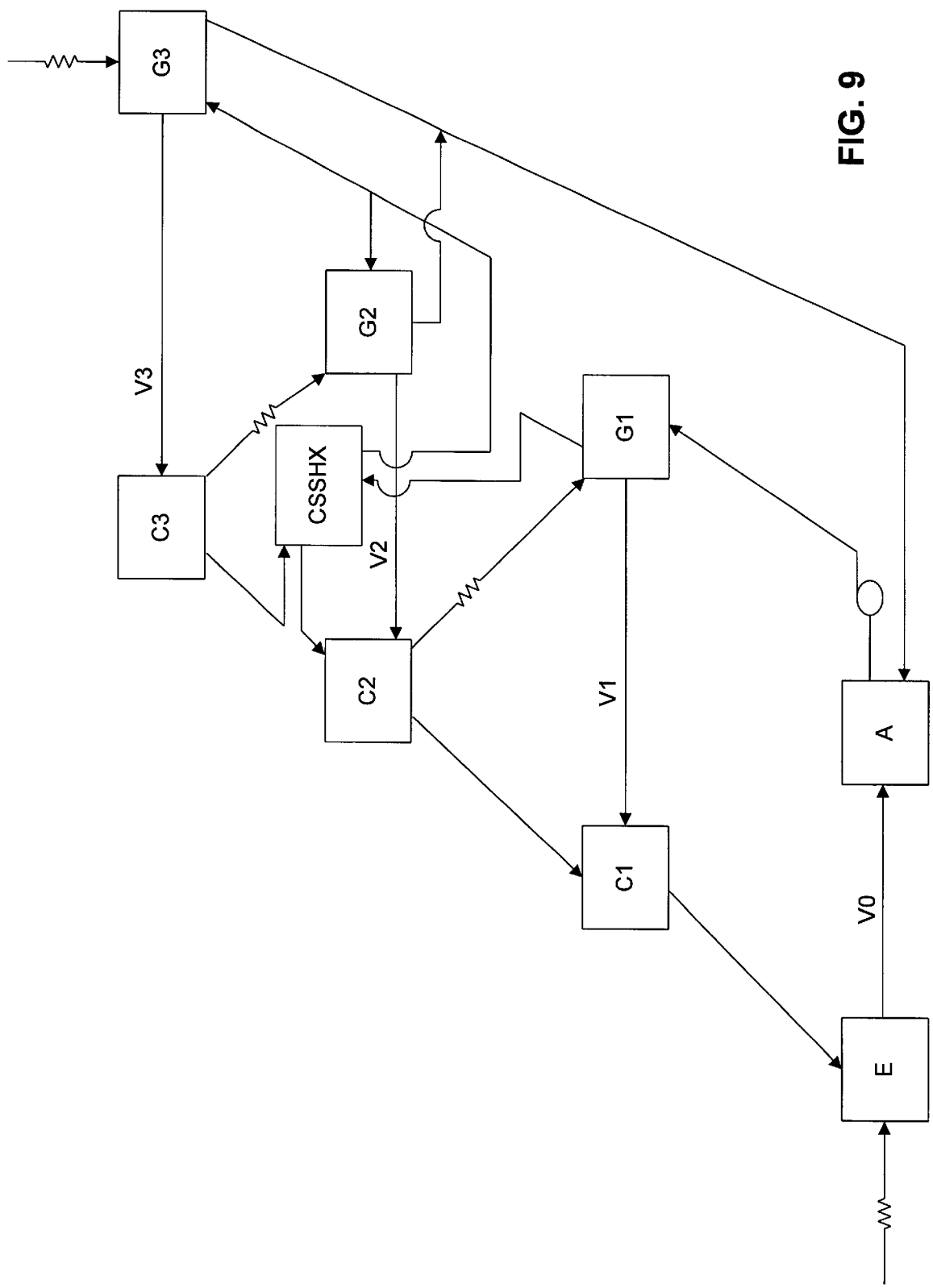
FIG. 9 is a schematic illustrating yet another further embodiment of the triple-effect absorption refrigeration system of the present invention.

An alternative preferred embodiment of the present invention is depicted in FIG. 3. In this embodiment, condensate-to-solution sensible heat exchanger CSSHX and second heat exchanger HX2 are connected in parallel, instead of in series as in FIG. 2. Thus, the portion of preheated solution S1 not flowing to generator G1 is further split into two subportions. The first subportion flows through condensate-to-solution sensible heat exchanger CSSHX. The second subportion flows through second heat exchanger HX2. The first and second subportions rejoin prior to entering second generator G2.

Design selection for first heat exchanger HX1, second heat exchanger HX2, and third heat exchanger HX3 is influenced by a number of factors including, but not limited to, capacity, cost, efficiency at full and partial load conditions, flow distribution, flow rates, and reliability. As generally embodied in FIGS. 2 and 3, in each heat exchanger HX1, HX2, and HX3, the flow rate of the hotter solution (i.e., S3 or S3 combined with S4) providing heat for preheating as it flows generally toward absorber A is comparable to that of the colder solution (i.e., S1 or S2) absorbing heat as it flows generally toward generator G1, G2, or G3. Presently, the inventor believes that a shell and tube heat exchanger is the preferred design for first heat exchanger HX1, second heat exchanger HX2, and third heat exchanger HX3.

Regarding the configuration of refrigerant-absorption solution flow to the first, second, and third generators, and as shown in FIGS. 1 and 4–9, the three generators may be connected in series (flowpath direction from A to G3, from G3 to G2, and from G2 to G1 (FIG. 4)), inverse series (flowpath direction from A to G1, from G1 to G2, and from G2 to G3 (FIG. 5)), parallel (flowpath direction from A simultaneously to G1, G2, and G3 (FIG. 6)), series-parallel (flowpath direction from A to G3, and from G3 simultaneously to G2 and G1 (FIG. 7)), parallel-series (flowpath direction from A simultaneously to G3 and G2, and from G3 and G2 simultaneously to G1 (FIG. 8)), inverse series-parallel (flowpath direction from A to G1, and from G1 simultaneously to G2 and G3 (FIG. 9)), inverse parallel-series (flowpath direction from A simultaneously to G1 and G2, and from G2 to G3 (FIG. 1)), or similar arrangements. As discussed above, in any of these configurations, one or more heat exchangers may be provided in the solution flowpaths in order to preheat the solution prior to entering the respective generators.

As discussed above, the invention can be applied to various solution flow arrangements. Presently, the inventor believes that the preferred flow arrangement is an inverse parallel-series relationship, shown in FIGS. 1–3.

As disclosed, the present invention uses the condensate sensible heat from the high temperature condensate to heat one or more solution streams to the intermediate or high temperature generators. As a result, the condensate sensible heat is recovered at higher temperatures, which leads to higher overall efficiency. More specifically, the invention leads to higher weak solution inlet temperatures. In addition, the heat input required at the high temperature generator is reduced.

The above description of the preferred embodiments of the invention have been presented for purposes of illustration and description. They are not intended to be exhaustive or to limit the invention to the precise form disclosed. Modifications and variations are possible in light of the above teachings, or may be acquired from practice of the invention. The embodiments were described in order to explain the principles of the invention, and their practical application was described to enable one skilled in the art to utilize the invention in various embodiments and with various modifications as are suited to the particular use contemplated. The scope of the invention is defined by the attached claims, and their equivalents.

I claim:

1. A triple-effect absorption refrigeration system, comprising:

an evaporator;

an absorber operatively coupled to the evaporator;

first, second, and third generators connected to receive a solution originating from the absorber and flowing to the first, second, and third generators;

a heat source for heating the solution in the third generator to a temperature, thereby separating the solution in the third generator into a strong refrigerant-absorption solution and a refrigerant vapor;

a flowpath for returning the strong refrigerant-absorption solution from the third generator to the absorber;

first, second, and third condensers operatively connected to receive and condense refrigerant vapor from the first, second, and third generators, respectively, the third condenser operatively connected to exchange heat with the second generator, and the second condenser operatively connected to exchange heat with the first generator; and a heat exchanger operatively connected to exchange heat between the condensed refrigerant vapor from the third condenser and the solution flowing directly to the second generator, but not directly to the third generator.

2. A triple-effect absorption refrigeration system, comprising:

an evaporator;

an absorber operatively coupled to the evaporator;

first, second, and third generators connected to receive a solution originating from the absorber and flowing to the first, second, and third generators;

a heat source for heating the solution in the third generator to a temperature, thereby separating the solution in the third generator into a strong refrigerant-absorption solution and a refrigerant vapor;

a flowpath for returning the strong refrigerant-absorption solution from the third generator to the absorber;

first, second, and third condensers operatively connected to receive and condense refrigerant vapor from the first, second, and third generators, respectively, the third condenser operatively connected to exchange heat with the second generator, and the second condenser operatively connected to exchange heat with the first generator; and a heat exchanger operatively connected to exchange heat between the condensed refrigerant vapor from the third condenser and the solution flowing to the second or third generator;

wherein the first and second generators are connected in parallel to receive the solution originating from the absorber and flowing to the first and second generators, and the third generator is connected to receive the solution originating from the absorber and flowing from the second generator to the third generator.

3. A triple-effect absorption refrigeration system, comprising:

an evaporator;

an absorber operatively coupled to the evaporator;

first, second, and third generators connected to receive a solution originating from the absorber and flowing to the first, second, and third generators;

a heat source for heating the solution in the third generator to a temperature, thereby separating the solution in the third generator into a strong refrigerant-absorption solution and a refrigerant vapor;

a first flowpath for returning the strong refrigerant-absorption solution from the third generator to the absorber;

first, second, and third condensers operatively connected to receive and condense refrigerant vapor from the first, second, and third generators, respectively, the third condenser operatively connected to exchange heat with the second generator, and the second condenser operatively connected to exchange heat with the first generator;

a heat exchanger operatively connected to exchange heat between the condensed refrigerant vapor from the third condenser and the solution flowing to the second generator; and a second flowpath for returning a second refrigerant-absorption solution from the first generator to the absorber, but no third flowpath for returning a third refrigerant-absorption solution from the second generator to the absorber.

4. A triple-effect absorption refrigeration system, comprising:

an evaporator;

an absorber operatively coupled to the evaporator;

first, second, and third generators connected to receive a solution originating from the absorber and flowing to the first, second, and third generators;

a heat source for heating the solution in the third generator to a temperature, thereby separating the solution in the third generator into a strong refrigerant-absorption solution and a refrigerant vapor;

a flowpath for returning the strong refrigerant-absorption solution from the third generator to the absorber;

first, second, and third condensers operatively connected to receive and condense refrigerant vapor from the first, second, and third generators, respectively, the third condenser operatively connected to exchange heat with the second generator, and the second condenser operatively connected to exchange heat with the first generator; and a condensate-to-solution sensible heat exchanger operatively connected to exchange heat between the condensed refrigerant vapor from the third condenser and the solution flowing to the second generator;

wherein the first and second generators are connected in parallel to receive the solution originating from the absorber and flowing to the first and second generators, and the third generator is connected to receive the solution originating from the absorber and flowing from the second generator to the third generator.

5. The triple-effect absorption refrigeration system of claim 4, further comprising a second heat exchanger operatively connected to preheat the solution originating from the absorber and flowing to the second generator, wherein the condensate-to-solution sensible heat exchanger is operatively connected in series with the second heat exchanger.

6. The triple-effect absorption refrigeration system of claim 5, further comprising third and fourth heat exchangers, wherein the third heat exchanger is operatively connected to preheat the solution originating from the absorber and flowing to the first and second generators, and the fourth heat exchanger is operatively connected to preheat the solution originating from the absorber and flowing from the second generator to the third generator.

7. The triple-effect absorption refrigeration system of claim 4, further comprising a second heat exchanger operatively connected to preheat the solution originating from the absorber and flowing to the second generator, wherein the condensate-to-solution sensible heat exchanger is operatively connected in parallel with the second heat exchanger.

8. The triple-effect absorption refrigeration system of claim 7, further comprising third and fourth heat exchangers, wherein the third heat exchanger is operatively connected to preheat the solution originating from the absorber and flowing to the first and second generators, and the fourth heat exchanger is operatively connected to preheat the solution originating from the absorber and flowing from the second generator to the third generator.

* * * * *